(12) United States Patent
Lambert

(10) Patent No.: US 11,287,065 B2
(45) Date of Patent: *Mar. 29, 2022

(54) MANUFACTURING OF PARALLEL WIRE CABLE

(71) Applicant: Ultimate Strength Cable, LLC, Tulsa, OK (US)

(72) Inventor: Walter L. Lambert, Muskogee, OK (US)

(73) Assignee: Ultimate Strength Cable, LLC, Tulsa, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/142,310

(22) Filed: Jan. 6, 2021

(65) Prior Publication Data

US 2021/0164590 A1    Jun. 3, 2021

Related U.S. Application Data

(63) Continuation of application No. 16/454,182, filed on Jun. 27, 2019, now Pat. No. 10,962,145, which is a continuation of application No. 16/185,049, filed on Nov. 9, 2018, now Pat. No. 10,376,051, which is a continuation of application No. 15/656,151, filed on Jul. 21, 2017, now Pat. No. 10,149,536, which is a continuation of application No. 14/283,292, filed on May 21, 2014, now Pat. No. 9,743,764.

(51) Int. Cl.
*F16L 3/06* (2006.01)
*D07B 5/00* (2006.01)
*E01D 19/16* (2006.01)

(52) U.S. Cl.
CPC ............... *F16L 3/06* (2013.01); *D07B 5/002* (2013.01); *E01D 19/16* (2013.01); *D07B 2501/203* (2013.01); *Y10T 29/49616* (2015.01); *Y10T 29/49828* (2015.01); *Y10T 428/12347* (2015.01)

(58) Field of Classification Search
CPC ..... F16L 3/06; D07B 5/002; D07B 2501/203; E01D 19/16; Y10T 29/49828; Y10T 428/12347; Y10T 29/49616
See application file for complete search history.

(56) References Cited

U.S. PATENT DOCUMENTS

| 364,077 A | 5/1887 | Addis |
|---|---|---|
| 448,786 A | 3/1891 | Ogden |
| 1,254,737 A | 1/1918 | Smithey |

(Continued)

FOREIGN PATENT DOCUMENTS

| CA | 2835139 | 1/2013 |
|---|---|---|
| CN | 108979949 | 12/2018 |

(Continued)

OTHER PUBLICATIONS

Google Translation DE 103 090 825 A1, 6 pages, translated Jul. 5, 2018.

(Continued)

*Primary Examiner* — Lynn E Schwenning
(74) *Attorney, Agent, or Firm* — Scott P. Zimmerman, PLLC

(57) ABSTRACT

A preassembled parallel wire cable creates a random cast of loops. Any of the random cast of loops is hung for transport, thus eliminating costly and time-consuming coiling and reeling operations.

2 Claims, 17 Drawing Sheets

(56) References Cited

U.S. PATENT DOCUMENTS

| | | |
|---|---|---|
| 1,459,623 A | 6/1923 | Gerrard et al. |
| 1,537,698 A | 5/1925 | Robinson |
| 2,095,721 A | 10/1937 | Sunderland |
| 2,141,138 A | 12/1938 | Reed |
| 2,501,202 A | 3/1950 | Bartieman |
| 2,803,363 A | 8/1957 | Hutchinson |
| 2,808,845 A | 10/1957 | De |
| 2,878,498 A | 3/1959 | Johannes |
| 2,945,457 A | 7/1960 | Avery et al. |
| 3,083,817 A | 4/1963 | Robert |
| 3,086,232 A | 4/1963 | Nixon |
| 3,104,778 A | 9/1963 | Leonard |
| 3,153,696 A | 10/1964 | Blanchard |
| 3,379,000 A | 4/1968 | Webber |
| 3,443,607 A | 5/1969 | Dittrich |
| 3,460,334 A | 8/1969 | Richard |
| 3,500,625 A | 3/1970 | Isao |
| 3,526,570 A | 9/1970 | Durkee et al. |
| 3,531,811 A | 10/1970 | Baker et al. |
| 3,542,087 A | 11/1970 | Fegley |
| 3,556,168 A | 1/1971 | Baker et al. |
| 3,586,226 A | 6/1971 | Nippert, Sr. |
| 3,659,633 A | 5/1972 | Durkee et al. |
| 3,715,877 A | 2/1973 | Akachi |
| 3,726,075 A | 4/1973 | Akachi |
| 3,777,428 A | 12/1973 | Caufield |
| 3,855,777 A | 12/1974 | Durkee |
| 3,885,777 A | 5/1975 | De Carbon |
| 3,919,762 A | 11/1975 | Borelly |
| 4,044,447 A | 8/1977 | Hamada |
| 4,106,957 A | 8/1978 | Tournoy |
| 4,192,057 A | 3/1980 | Borelly |
| 4,200,212 A | 4/1980 | Hartig |
| 4,203,267 A | 5/1980 | Langhorst |
| 4,258,518 A | 3/1981 | Xercavins |
| 4,266,911 A | 5/1981 | Helm |
| 4,409,050 A | 10/1983 | Carter, Jr |
| 4,488,649 A | 12/1984 | Mark |
| 4,517,467 A | 5/1985 | Fuhring |
| 4,533,297 A | 8/1985 | Bassett |
| 4,545,728 A | 10/1985 | Cheney, Jr. |
| 4,594,827 A | 6/1986 | Finsterwalder |
| 4,617,789 A | 10/1986 | Borden |
| 4,648,146 A | 3/1987 | Nutzel |
| 4,673,309 A | 6/1987 | Schlaich et al. |
| 4,792,700 A | 12/1988 | Ammons |
| 4,840,214 A | 6/1989 | Bourgois |
| 4,841,714 A | 6/1989 | Meier |
| 4,979,871 A | 12/1990 | Reiner |
| 5,056,284 A | 10/1991 | Ruckdeschel et al. |
| 5,083,469 A | 1/1992 | Percheron et al. |
| 5,167,399 A | 12/1992 | Delomel |
| 5,299,913 A | 4/1994 | Heidelberg |
| 5,400,584 A | 3/1995 | Ito |
| 5,543,196 A | 8/1996 | Robinson |
| 5,573,852 A | 11/1996 | Thal |
| 5,688,098 A | 11/1997 | Theno |
| 5,809,710 A | 9/1998 | Jungwirth |
| 5,888,321 A | 3/1999 | Kazama |
| 5,956,935 A | 9/1999 | Katayama |
| 6,109,460 A | 8/2000 | Herlevi |
| 6,315,249 B1 | 11/2001 | Jensen |
| 6,523,776 B1 | 2/2003 | Elder |
| 6,614,125 B2 | 9/2003 | Willis et al. |
| 6,658,684 B2 | 12/2003 | Stubler et al. |
| 6,715,176 B2 | 4/2004 | Stubler |
| 6,800,956 B2 | 10/2004 | Bartlett |
| 6,929,450 B2 | 8/2005 | Noble |
| 6,944,550 B2 | 9/2005 | Marchetti |
| 6,968,779 B2 | 11/2005 | Doyle |
| 6,979,175 B2 | 12/2005 | Drake |
| 7,003,835 B2 | 2/2006 | Figg, Jr. et al. |
| 7,010,824 B2 | 3/2006 | Stubler et al. |
| 7,076,985 B2 | 7/2006 | Rex |
| 7,105,940 B2 | 9/2006 | Weesner |
| 7,124,460 B2 | 10/2006 | Lecinq et al. |
| 7,126,235 B2 | 10/2006 | Bernhoff |
| 7,188,814 B2 | 3/2007 | Davis |
| 7,431,610 B2 | 10/2008 | Laursen |
| 7,508,088 B2 | 3/2009 | Kothnur et al. |
| 7,677,506 B1 | 3/2010 | Hammer |
| 7,683,498 B2 | 3/2010 | Stommel |
| 8,074,347 B2 | 12/2011 | Anderson et al. |
| 8,464,497 B2 | 6/2013 | Lambert |
| 8,474,219 B2 | 7/2013 | Lambert |
| 8,667,766 B2 | 3/2014 | Lambert |
| 8,747,219 B2 | 6/2014 | Wright et al. |
| 8,759,678 B2 | 6/2014 | Filatov |
| 8,881,471 B1 | 11/2014 | Theobald |
| 8,967,943 B2 | 3/2015 | Drott |
| 9,062,421 B2 | 6/2015 | Brand |
| 9,334,091 B2 | 5/2016 | Zantout |
| 9,458,642 B2 | 10/2016 | Lambert |
| 9,743,764 B2 | 8/2017 | Lambert |
| 10,036,118 B2 | 7/2018 | Cullen |
| 10,149,536 B2 | 12/2018 | Lambert |
| 10,278,493 B2 | 5/2019 | Lambert |
| 10,376,051 B2 * | 8/2019 | Lambert .................. F16L 3/06 |
| 10,758,041 B2 | 9/2020 | Lambert |
| 10,962,145 B2 * | 3/2021 | Lambert ................ E01D 19/16 |
| 2002/0095878 A1 | 7/2002 | Henderson |
| 2003/0086755 A1 | 5/2003 | Stubler |
| 2003/0110583 A1 | 6/2003 | Stubler |
| 2003/0141721 A1 | 7/2003 | Barlett |
| 2004/0001752 A1 | 1/2004 | Noble |
| 2004/0128776 A1 | 7/2004 | Eicher |
| 2004/0237222 A1 | 12/2004 | Stubler |
| 2004/0247438 A1 | 12/2004 | McCoin |
| 2004/0265127 A1 | 12/2004 | Noble |
| 2005/0151376 A1 | 7/2005 | Bernhoff |
| 2005/0193794 A1 | 9/2005 | Rex |
| 2005/0218657 A1 | 10/2005 | Weesner |
| 2006/0151767 A1 | 7/2006 | Wobben |
| 2006/0185318 A1 | 8/2006 | Lecinq |
| 2007/0271897 A1 | 11/2007 | Hanna |
| 2008/0028740 A1 | 2/2008 | Ushijima |
| 2008/0078128 A1 | 4/2008 | Livingston et al. |
| 2008/0116152 A1 | 5/2008 | Datri |
| 2008/0210330 A1 | 9/2008 | Anderson et al. |
| 2008/0250576 A1 | 10/2008 | Brand et al. |
| 2009/0126313 A1 | 5/2009 | Jolly |
| 2009/0167023 A1 | 7/2009 | Nies |
| 2009/0224498 A1 | 9/2009 | Diedericks |
| 2009/0307998 A1 | 12/2009 | Zavitz et al. |
| 2010/0090053 A1 | 4/2010 | Stiltner |
| 2010/0202881 A1 | 8/2010 | Nygaard |
| 2010/0226772 A1 | 9/2010 | Deering |
| 2010/0319983 A1 | 12/2010 | De Abreu et al. |
| 2010/0322766 A1 | 12/2010 | Haans et al. |
| 2011/0016804 A1 | 1/2011 | Howard |
| 2011/0206510 A1 | 8/2011 | Landen et al. |
| 2011/0240626 A1 | 10/2011 | Mullebrouck |
| 2011/0278852 A1 | 11/2011 | Hjort |
| 2012/0045345 A1 | 2/2012 | Horton, III |
| 2012/0084948 A1 | 4/2012 | Breen, IV |
| 2012/0139253 A1 | 6/2012 | Lambert |
| 2012/0260590 A1 | 10/2012 | Lambert |
| 2013/0164134 A1 | 6/2013 | Goldstein |
| 2013/0170941 A1 | 7/2013 | Drott |
| 2013/0305624 A1 | 11/2013 | Thrush |
| 2013/0309521 A1 | 11/2013 | Lambert |
| 2014/0232118 A1 | 8/2014 | Luigi |
| 2014/0361540 A1 | 12/2014 | Knight |
| 2015/0128384 A1 | 5/2015 | Breen, IV |
| 2015/0308414 A1 | 10/2015 | Roer |
| 2015/0335154 A1 | 11/2015 | Lambert |
| 2016/0215761 A1 | 7/2016 | Rohden |
| 2016/0215762 A1 | 7/2016 | Rohden |
| 2016/0333853 A1 | 11/2016 | Knight |
| 2017/0114776 A1 | 4/2017 | Tucciarone |
| 2017/0190391 A1 | 7/2017 | Siegfriedsen |
| 2017/0318962 A1 | 11/2017 | Lambert |
| 2017/0362772 A1 | 12/2017 | Cullen |

(56) References Cited

U.S. PATENT DOCUMENTS

| | | |
|---|---|---|
| 2018/0184805 A1 | 7/2018 | Lambert |
| 2019/0216217 A1 | 7/2019 | Lambert |
| 2020/0245762 A1 | 8/2020 | Lambert |

FOREIGN PATENT DOCUMENTS

| | | |
|---|---|---|
| DE | 459035 | 4/1928 |
| DE | 1938931 | 2/1971 |
| DE | 2806081 | 8/1979 |
| DE | 103090825 | 9/2004 |
| DE | 102015000818 | 12/2015 |
| EP | 2732156 | 8/2016 |
| JP | 03222872 | 10/1991 |

OTHER PUBLICATIONS

Irvine, H. Max, "Cable Structures," 1981, MIT Press, Cambridge Massachusetts.

* cited by examiner

MANUFACTURING OF PARALLEL WIRE CABLE

CROSS-REFERENCE TO RELATED APPLICATIONS

This patent application is a continuation of U.S. application Ser. No. 16/454,182 filed Jun. 27, 2019 and since issued as U.S. Pat. No. 10,962,145, which is continuation of U.S. application Ser. No. 16/185,049 filed Nov. 9, 2018 and since issued as U.S. Pat. No. 10,376,051, which is continuation of U.S. application Ser. No. 15/656,151 filed Jul. 21, 2017 and since issued as U.S. Pat. No. 10,149,536, which is continuation of U.S. application Ser. No. 14/283,292 filed May 21, 2014 and since issued as U.S. Pat. No. 9,743,764, with all patent applications incorporated herein by reference in their entireties. This patent application also relates to U.S. patent application Ser. No. 13/084,693 filed Apr. 12, 2011 and to U.S. patent application Ser. No. 13/946,133 filed Jul. 19, 2013, with both patent applications also incorporated herein by reference in their entireties.

BACKGROUND

Parallel wire cables have long been desired as structural components. Parallel wire cables, though, twist and coil, making handling and transportation difficult and even unsafe. Conventional manufacturing techniques, then, coil the wire cables, which greatly increases their costs.

BRIEF DESCRIPTION OF THE SEVERAL VIEWS OF THE DRAWINGS

The features, aspects, and advantages of the exemplary embodiments are better understood when the following Detailed Description is read with reference to the accompanying drawings, wherein.

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. Those of ordinary skill in the art further understand that the exemplary cables described herein are for illustrative purposes and, thus, are not intended to be limited to any particular manufacturing process and/or manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another.

Figure 1:
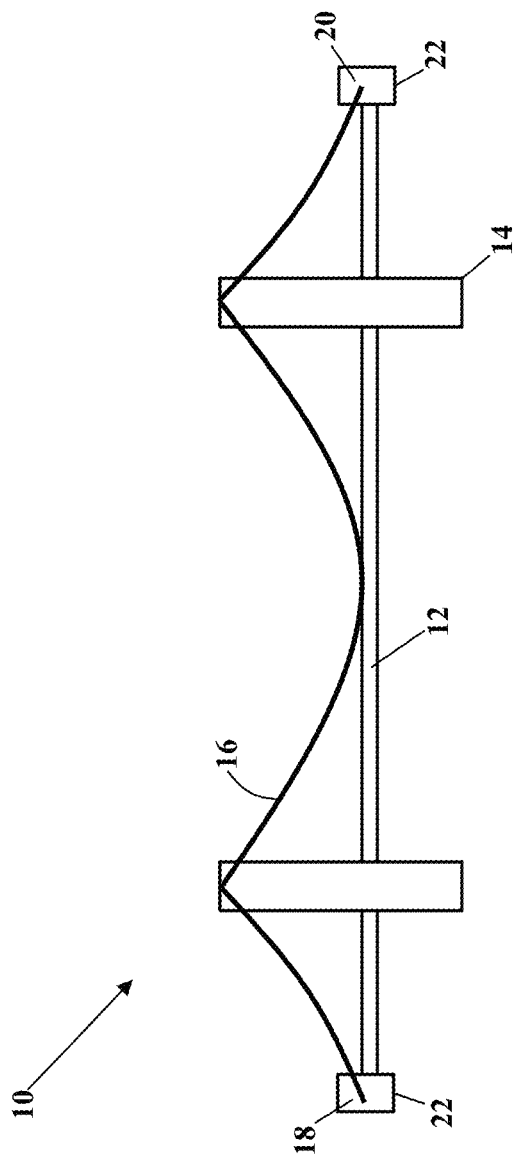
FIGS. 1 and 2 are schematics illustrating a few operating environments, according to exemplary embodiments.
Figure 2:
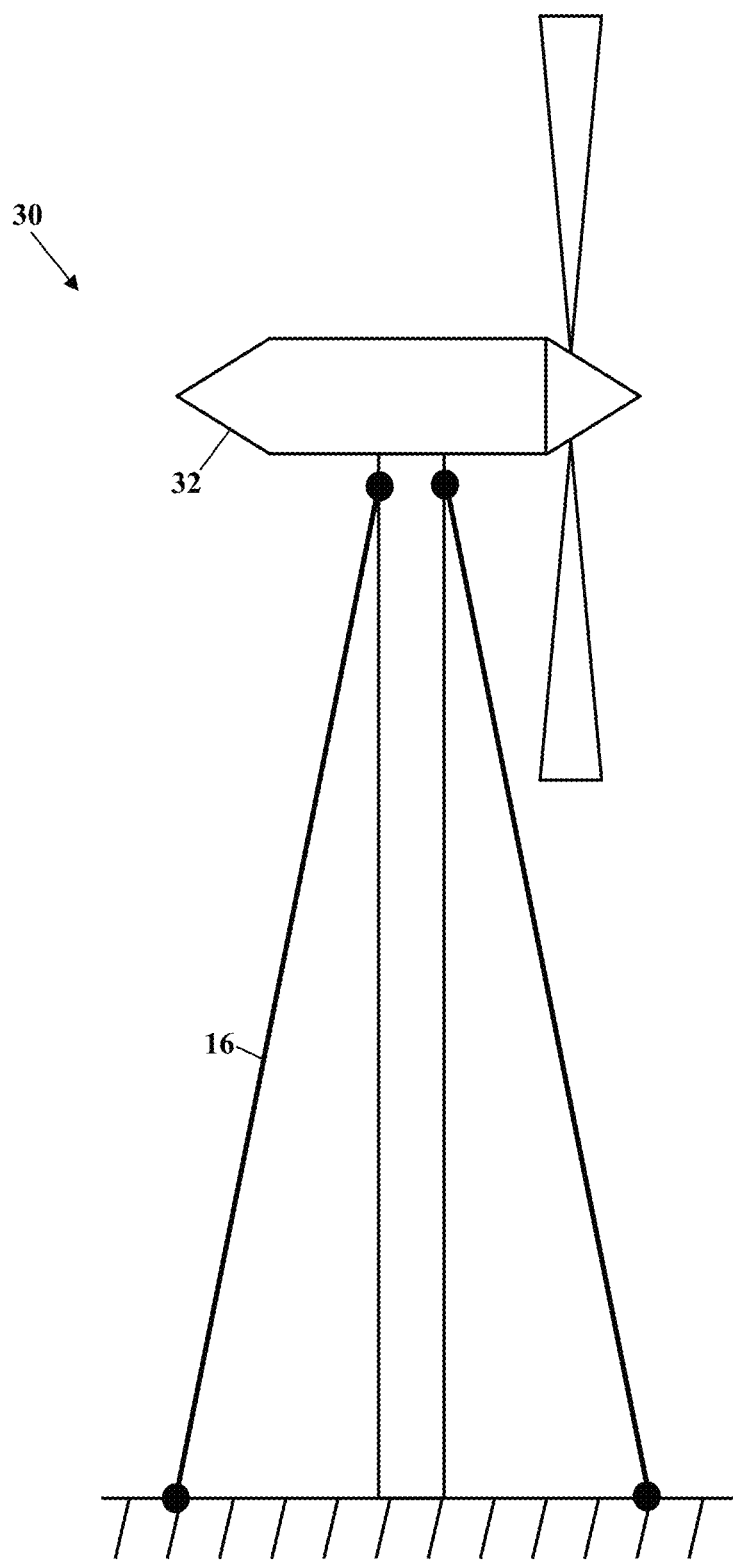

FIGS. 1 and 2 are schematics illustrating a few operating environments, according to exemplary embodiments. FIG. 1 illustrates a suspension bridge 10 having a deck 12 supported by one or more pillars 14 (or "towers") and by a structural cable 16. The structural cable 16 anchors at opposite ends 18 and 20 by structural anchors 22. Tension in the structural cable 16 helps support the weight of the deck 12. As the following paragraphs will explain, exemplary embodiments preassemble the structural cable 16. That is, the structural cable 16 may be manufactured off-site and then transported to the suspension bridge 10 for installation. The structural cable 16 may thus be preassembled in a controlled and safe environment, which greatly reduces the costs of the suspension bridge 10.

FIG. 2 illustrates another operating environment. Here the structural cable 16 supports a generally vertical structure 30. The vertical structure 30 is illustrated as a wind turbine 32, but the vertical structure 30 may be any apparatus (such as a drilling rig, antenna, or tower for utility cables and lines). The structural cable 16 stays, or stabilizes, the vertical structure 30. Again, because the structural cable 16 may be manufactured off-site and then transported to the job location, exemplary embodiments greatly reduce the costs of the vertical structure 30.

Figure 3:
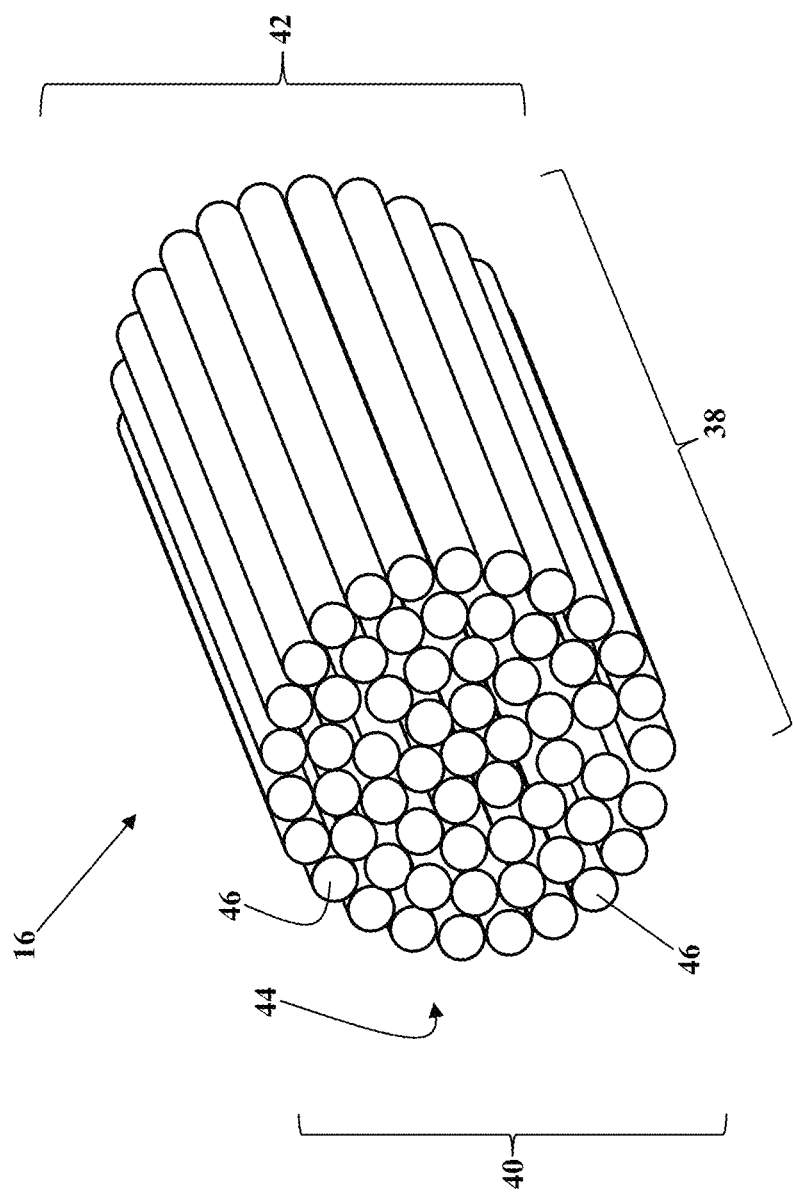
FIGS. 3-5 are more detailed schematics illustrating a structural cable, according to exemplary embodiments.
Figure 4:
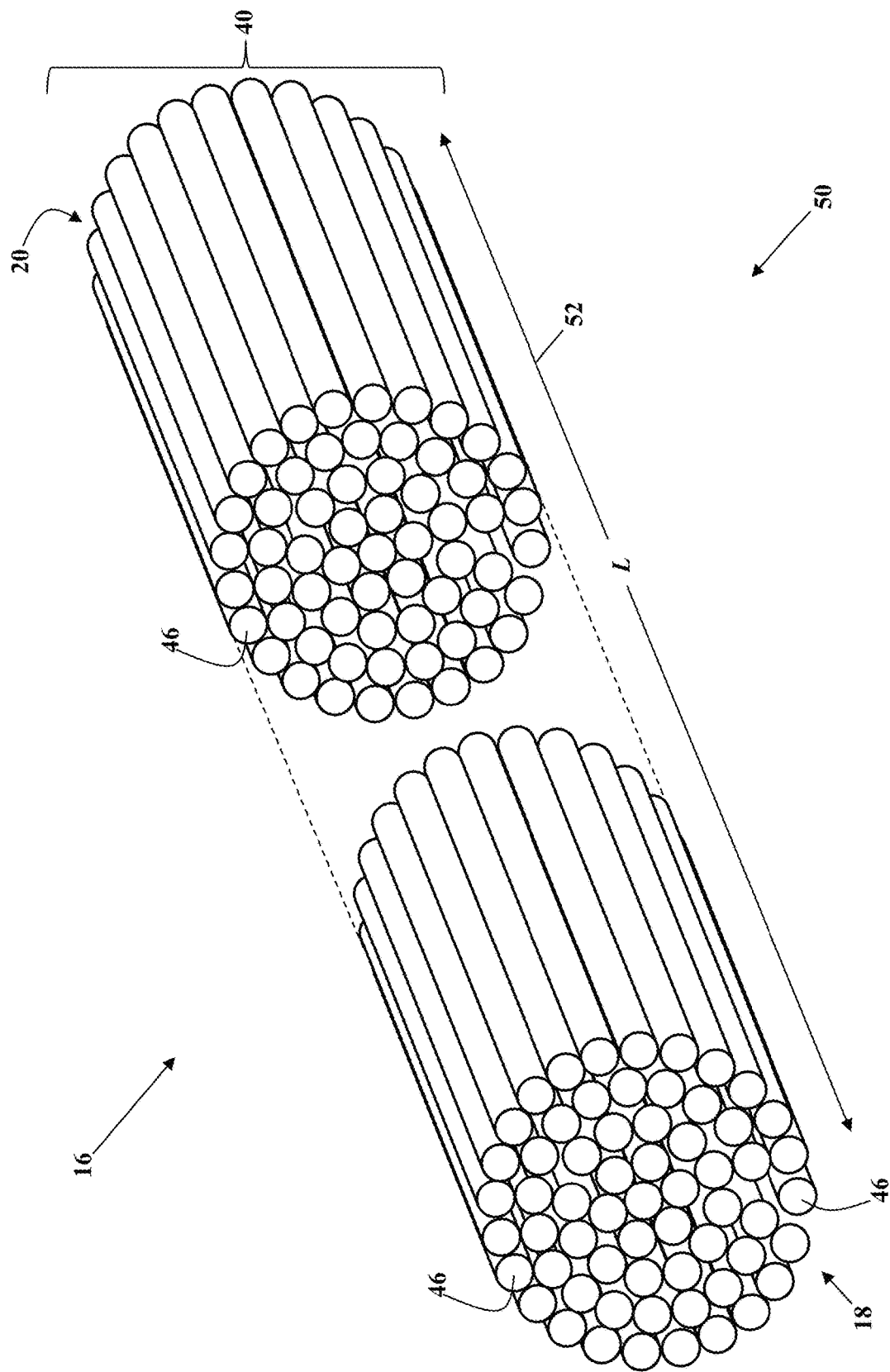
Figure 5:
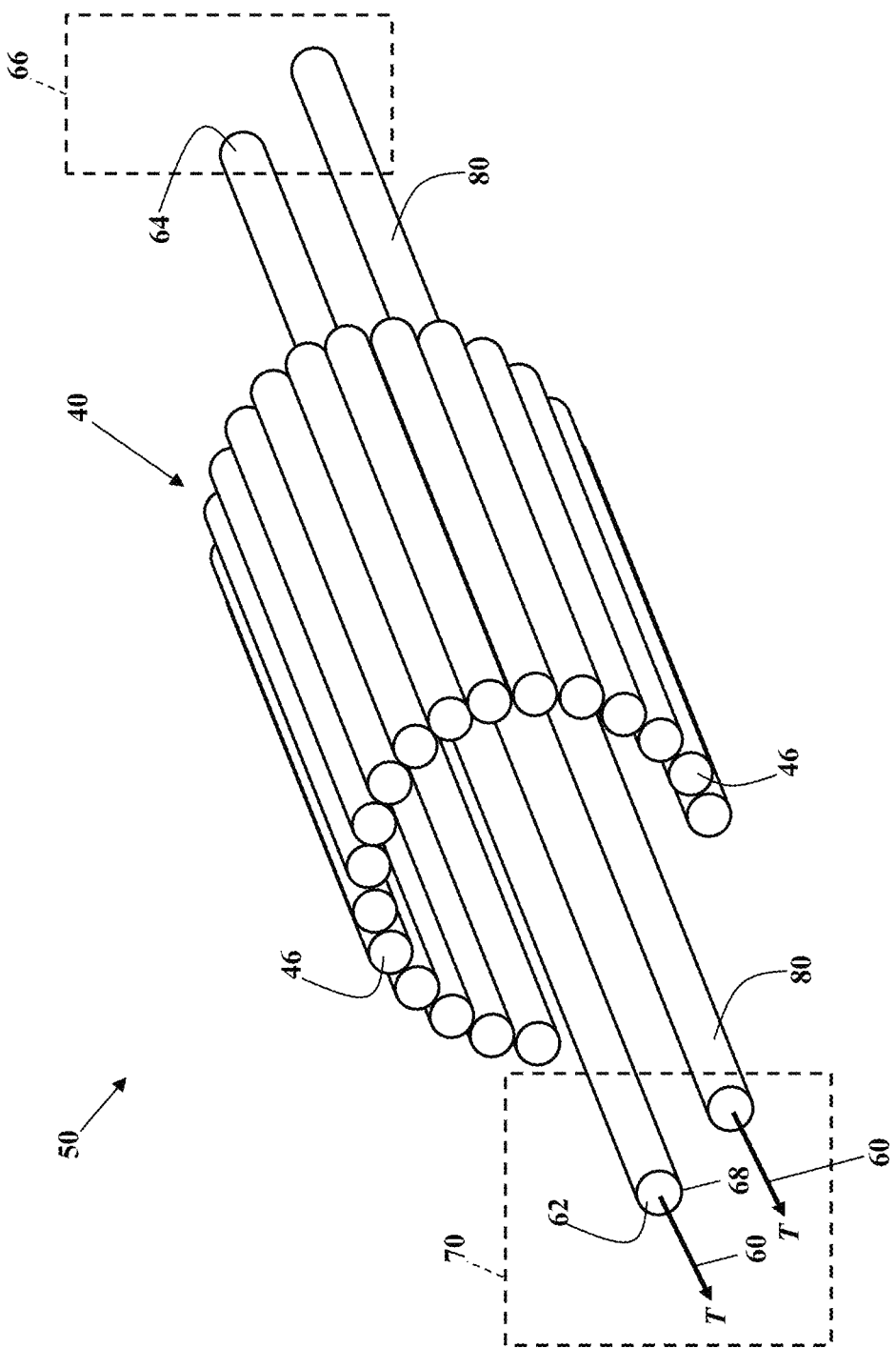

FIGS. 3-5 are more detailed schematics illustrating the structural cable 16, according to exemplary embodiments. FIG. 3, for simplicity, only illustrates a short, longitudinal portion 38 of the structural cable 16. As the reader may understand, the structural cable 16 can be very long, perhaps hundreds or even thousands of feet in length. FIG. 3 thus only illustrates a cross-sectional portion to better illustrate its prefabricated construction. The structural cable 16 has a plurality 40 of wires. The plurality 40 of wires is illustrated as a bundle 42 having a circular shape 44. The plurality 40 of wires, however, may be bundled in any cross-sectional shape desired (such as hexagonal, triangular, or square). Each individual wire 46 in the plurality 40 of wires may be constructed of any metallic and/or non-metallic material. An individual wire 46, for example, may be a five (5) or seven (7) millimeter diameter steel wire (or any other diameter or gauge wire suitable for structural cable). Any of the individual wires 46, however, may be constructed from any metallic material (such as aluminum or copper), carbon fiber material, and/or composite material. Each individual wire 46 is illustrated as having a circular cross-sectional shape, but any of the wires 46 may have any other cross-sectional shape (such as hexagonal, triangular, polygonal, or even a variable cross-sectional shape).

FIG. 4 illustrates a parallel construction. The individual wires 46 are substantially parallel to each other. Because the structural cable 16 may be hundreds or thousands of feet in length, FIG. 4 omits a central section for ease of illustration. Regardless, each wire 46 in the plurality 40 of wires is parallel to every other wire 46. The structural cable 16, then, is a parallel wire cable 50, where the individual wires 46 are parallel along their entire length L (illustrated as reference numeral 52) from the one end 18 to the opposite end 20. Each wire 46 in the plurality 40 of individual wires may also be equal in length 52 to every other wire 46. Each wire 46 in the parallel wire cable 50, in other words, may be parallel to, and equal in length 52 to, every other wire 46. Because each wire 46 is parallel to every other wire 46, no winding operation is required. The parallel wire cable 50, in other words, need not be spirally or helically wound.

FIG. 5 illustrates individual tensioning. Exemplary embodiments apply a tension value T (illustrated as reference numeral 60) to each wire 46 in the parallel wire cable 50. In practice there may be many, even hundreds, of the individual wires 46 in the parallel wire cable 50. FIG. 5, though, only illustrates a few wires 46 in the parallel wire cable 50 to simplify explanation. Each wire 46 in the plurality 40 of individual wires may have an equal, or nearly equal, tension to every other wire 46 in the parallel wire cable 50. The tension value 60 is applied to one individual wire 62 of the individual wires 46. An end 64 of the individual wire 62 is mechanically locked, held, or secured in a first fixture 66. An opposite end 68 of the individual wire 62 is then drawn or pulled to the desired tension value 60. When the desired tension value 60 is attained, the opposite end 68 of the individual wire 62 is then mechanically locked, held, or secured in a second fixture 70.

Pretensioning is repeated. Once the tension value 60 is applied to the individual wire 62, then a different wire 80 is selected and the same tension value 60 is pulled. Afterwards yet another different wire 46 is sequentially or randomly selected and pulled to the tension value 60. This pretensioning procedure is repeated until all the individual wires 46 have been individually pulled to approximately the same tension value 60. Each wire 46 in the plurality 40 of individual wires may thus have the equal tension value 60 to every other wire 46 in the parallel wire cable 50.

Tension is applied to each wire 46, not strands of wires. Methods are known that tension strands of plural wires. A strand, in the art of structural cable, is defined as a group of multiple wires. Conventional methods are known that apply tension to a strand of multiple wires. Exemplary embodiments, in contradistinction, apply the tension value 60 to each individual wire 46 in the parallel wire cable 50. Each wire 46 in the plurality 40 of individual wires has the equal tension value 60 as every other wire 46 in the parallel wire cable 50.

Individual pretensioning of each wire 46 will provide lighter, cheaper, and stronger cable designs. The individually tensioned parallel wire cable 50 weighs significantly less than conventional designs, but the strength of the parallel wire cable 50 is still greater than conventional designs. Alternatively, exemplary embodiments may be used to construct the parallel wire cable 50 that is similar in size to conventional designs, but is substantially stronger to support greater loads and/or spans. Exemplary embodiments have greater tensile strength, greater compressive strength, greater yield strength, and substantially increased fatigue life when compared to conventional designs, yet exemplary embodiments react the same as any steel member. Exemplary embodiments thus offer greater design alternatives that require less material, production, and transportation costs.

Figure 6:
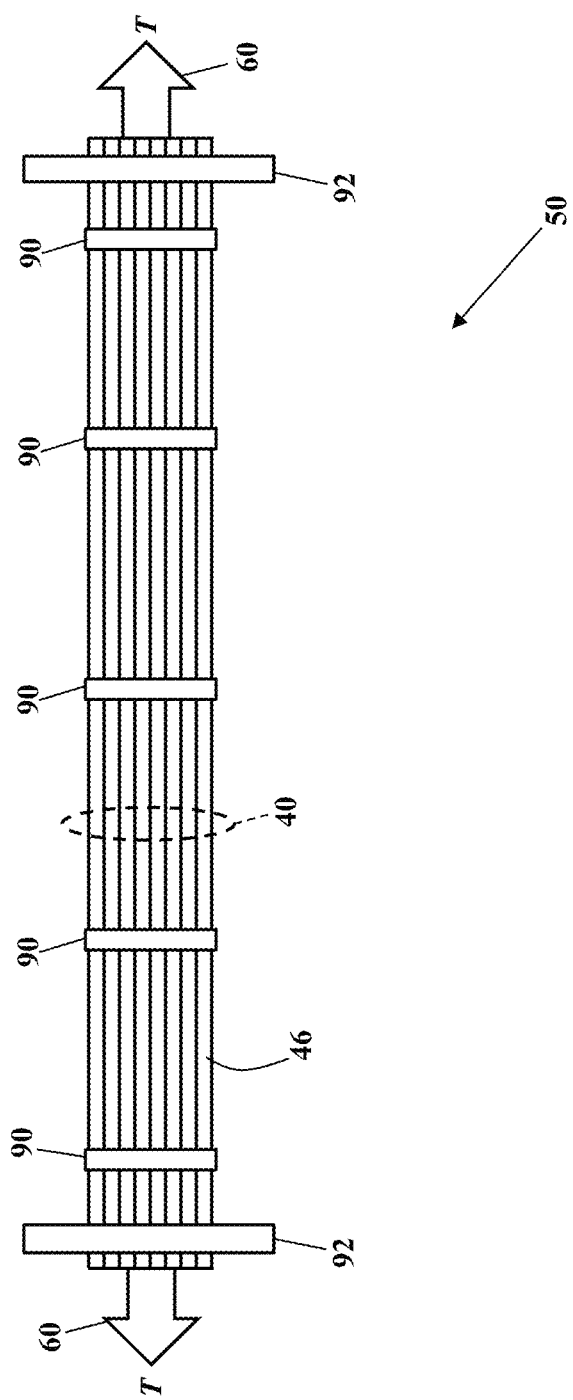
FIG. 6 is a schematic illustrating prefabrication and preassembly of a parallel wire cable, according to exemplary embodiments.

FIG. 6 is a schematic illustrating prefabrication and preassembly of the parallel wire cable 50, according to exemplary embodiments. As this disclosure explains, exemplary embodiments individually pull each wire 46 in the parallel wire cable 50. Physical testing shows that the resulting parallel wire cable 50 has a similar yield strength to conventional designs of many more wires. That is, exemplary embodiments exhibit similar strength using fewer wires 46. The resulting parallel wire cable 50 thus has a smaller overall diameter, and less weight, than conventional designs using many more wires. Material costs are thus greatly reduced.

The parallel wire cable 50 may thus be prefabricated and preassembled. As this disclosure earlier explained, the individually tensioned parallel wire cable 50 may be prefabricated offsite in a shop environment, where temperature and other factors are better controlled. Once the plurality 40 of wires has been individually tensioned, exemplary embodiments may seize the parallel wire cable 50 with seizings 90 to maintain the tension value 60 in each wire 46. The plurality 40 of wires may then be cut to a desired overall length (illustrated as reference numeral 52 in FIG. 4). End attachments, known as sockets 92, may also be added to each end (e.g., illustrated as reference numerals 18 and 20 in FIGS. 1 and 4) of the parallel wire cable 50. Because the parallel wire cable 50 is fabricated and assembled in the shop environment, exemplary embodiments allow preassembly without conventional aerial spinning at a construction site.

Figure 7:
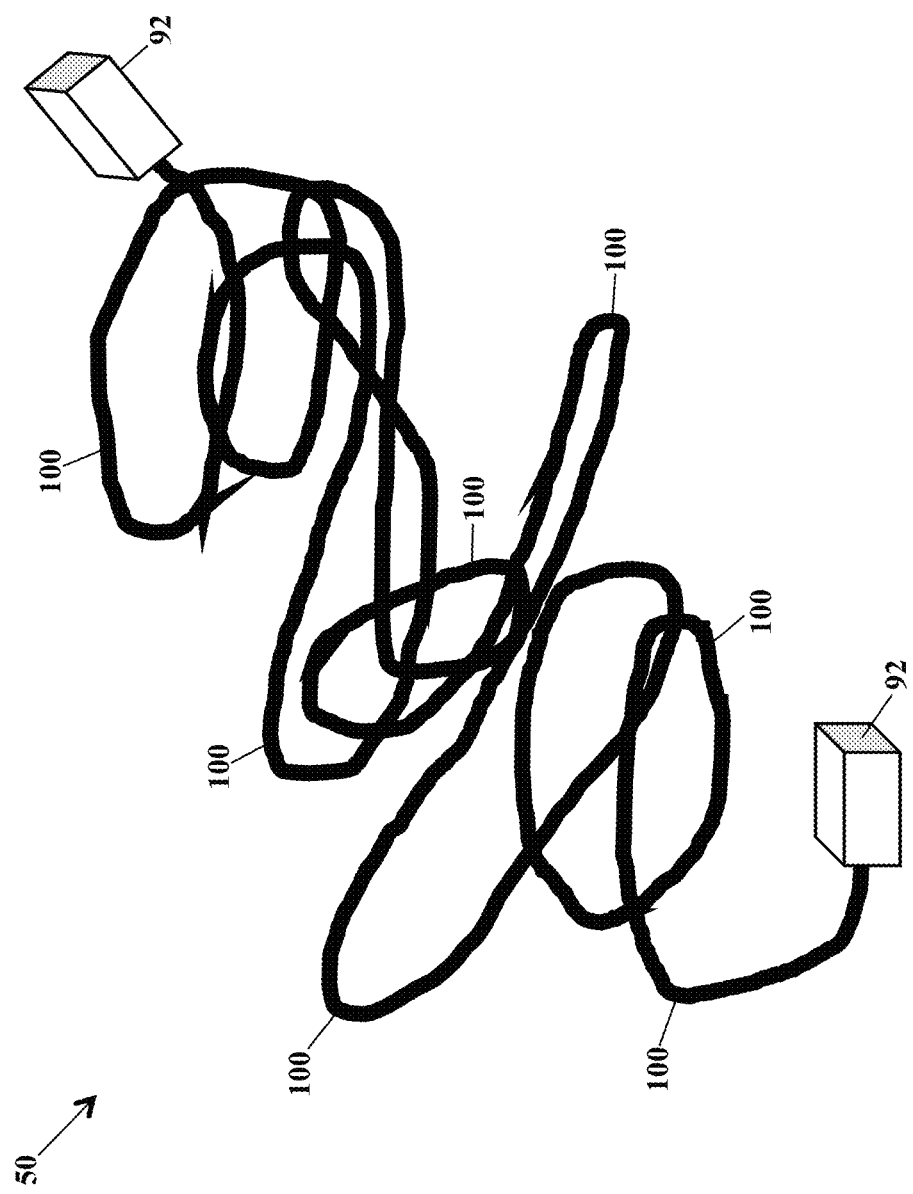
FIG. 7 is a schematic illustrating a memory cast of a preassembled parallel wire cable, according to exemplary embodiments.

FIG. 7 is a schematic illustrating a memory cast of the preassembled parallel wire cable 50, according to exemplary embodiments. Once the parallel wire cable 50 is preassembled, the tension may be removed. When the tension is released, though, the preassembled parallel cable 50 may randomly twist and turn in unpredictable directions. The preassembled parallel wire cable 50 thus assumes an intricate and confusing configuration creating a random cast 100 of loops. Curvature, or cast, in the individual wires (illustrated as reference numeral 46 in FIGS. 3-5) causes the random cast 100 of loops. When each individual wire 46 is manufactured at a foundry, each individual wire 46 has a curvature or cast (usually caused by coiling and reeling). Even though the individual wire 46 is then pulled straight to the tension value (as above explained), once released the individual wire 46 has structural memory and bends to return to its original shape. As there may be many individual wires 46 in the preassembled parallel wire cable 50, the individual memories in the individual wires 46 unpredictably create the random cast 100 of loops. Once the tension is released in the wires 46, then, the preassembled parallel wire cable 50 assumes the random cast 100 of loops having various convex and concave inflections of differing radii, angle, and/or diameter that may easily tangle.

Figure 8:
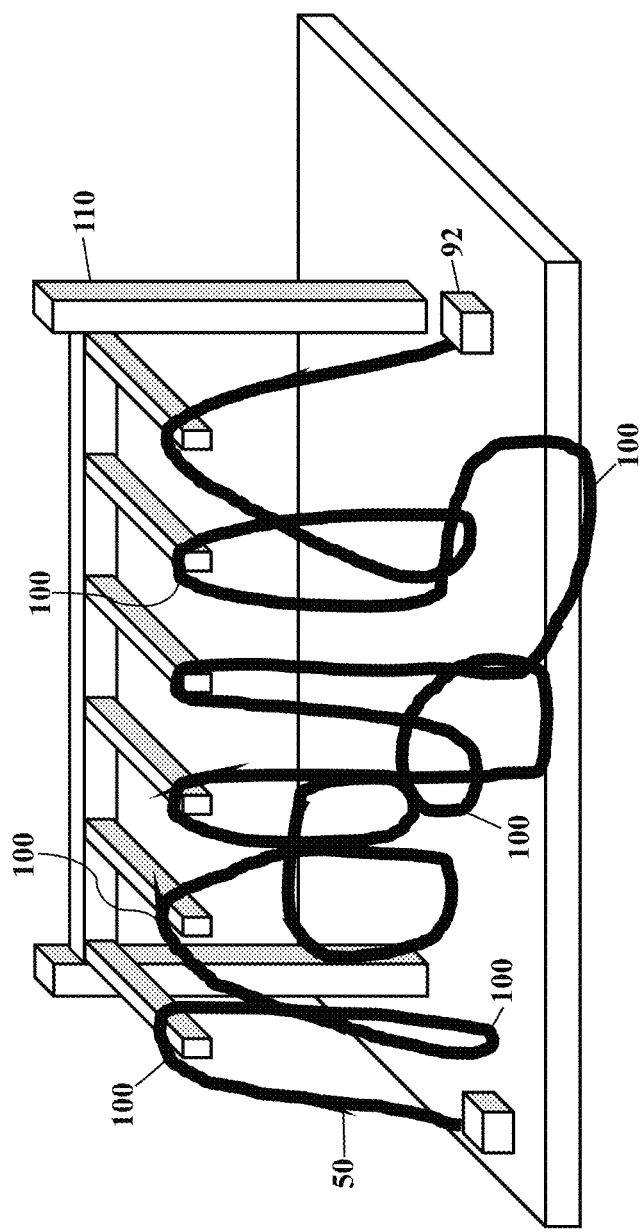
FIGS. 8-10 are schematics illustrating a transportation rack, according to exemplary embodiments.
Figure 9:
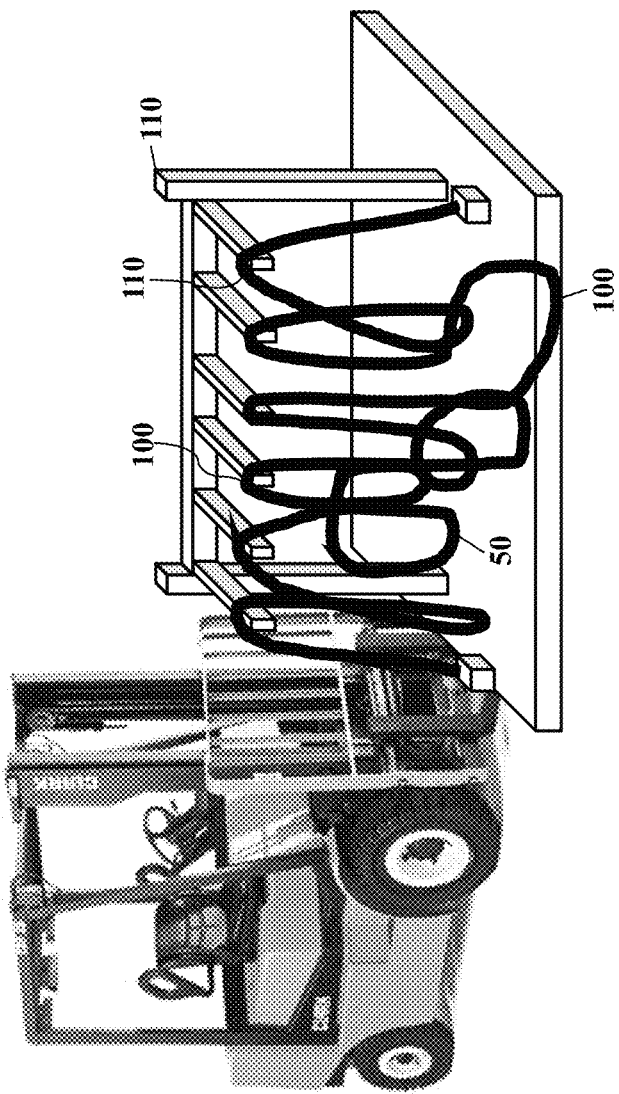

FIGS. 8-9 are schematics illustrating a transportation rack 110, according to exemplary embodiments. Even though the preassembled parallel wire cable 50 may exhibit the random cast 100 of loops, the preassembled parallel wire cable 50 may be advantageously transported without conventional coiling and reeling. Conventional manufacturing techniques reel cables onto a large spool, and the spool is then loaded onto a trailer or boat for transport. An expensive coiling machine or process is thus conventionally used, which increases handling and tooling costs. Exemplary embodiments, instead, utilize the memory in the random cast 100 of loops as a handling and transportation feature. Exemplary embodiments thus utilize the random cast 100 of loops to avoid and eliminate conventional coiling/reeling techniques.

As FIG. 8 illustrates, the preassembled parallel wire cable 50 is hung from the transportation rack 110. Even though the preassembled parallel cable 50 creates the random cast 100 of loops, exemplary embodiments advantageously use the random cast 100 of loops for transport. After the parallel wire cable 50 is preassembled, any of the random cast 100 of loops may be hung from the rack 110. A human worker or lifting machine need only grasp and hang one or more of the random cast 100 of loops onto the rack 110. As FIG. 9 illustrates, the rack 110 may then be moved and loaded onto a trailer, ship, or barge for delivery to the installation site. Because the random cast 100 of loops is hung from the rack 110, no coiling and reeling operation is needed. Exemplary embodiments thus further reduce the costs of the preassembled parallel cable 50.

Figure 10:
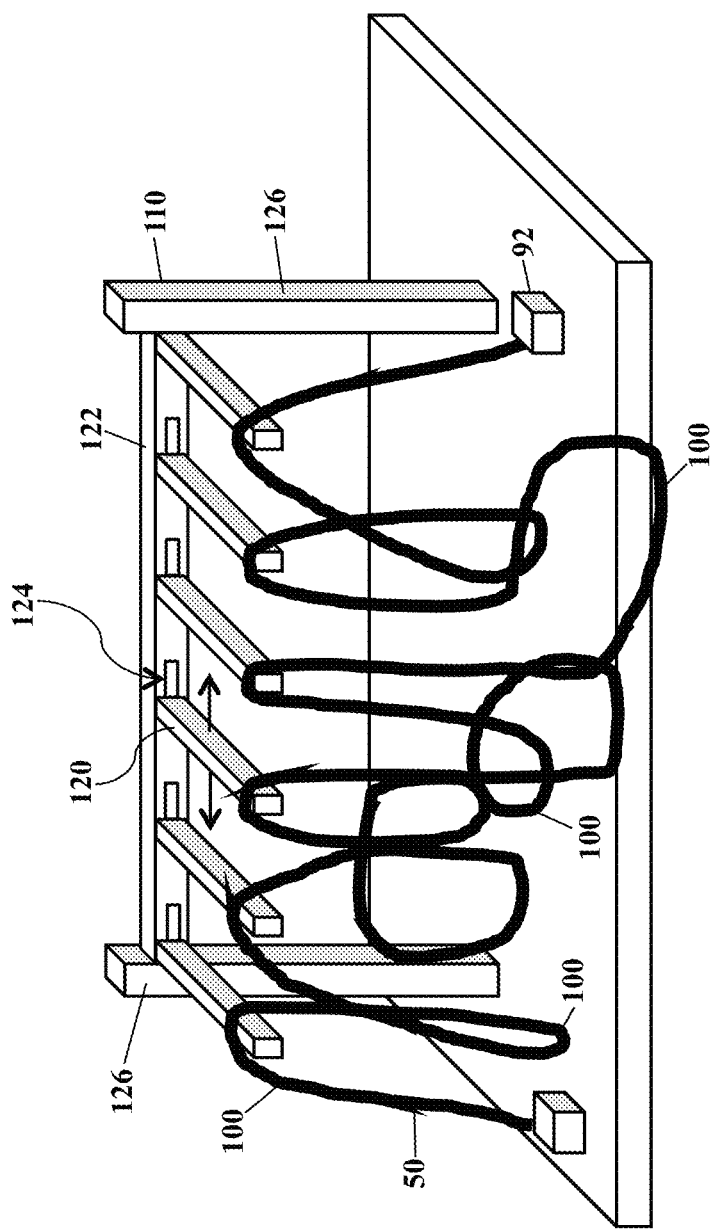

FIG. 10 is a more detailed schematic illustrating the transportation rack 110, according to exemplary embodiments. Here the transportation rack 110 may be adjustable to accommodate the unpredictable random cast 100 of loops. Because the preassembled parallel cable 50 may randomly twist and turn in unpredictable directions, workers cannot predict the configuration of the random cast 100 of loops. The transportation rack 110 may thus include one or more means for adjusting its hanger configuration to suit the random cast 100 of loops.

The transportation rack 110 may have one or more arms 120. Each one of the arms 120 may laterally extend outward from a central beam 122. The central beam 122 may be a hollow-walled tube, such as a steel square or round tube. Because the central beam 122 is hollow, the central beam 122 may include one or more longitudinal slots 124 from which the arms 120 protrude or insert. Each arm 120 may thus longitudinally slide along its corresponding longitudinal slot 124. Each arm 120 may thus be longitudinally positioned along the central beam 122 to accommodate at least one of the random cast 100 of loops. One or more upright supports 126 elevate the central beam 122 to any desired height.

Figure 11:
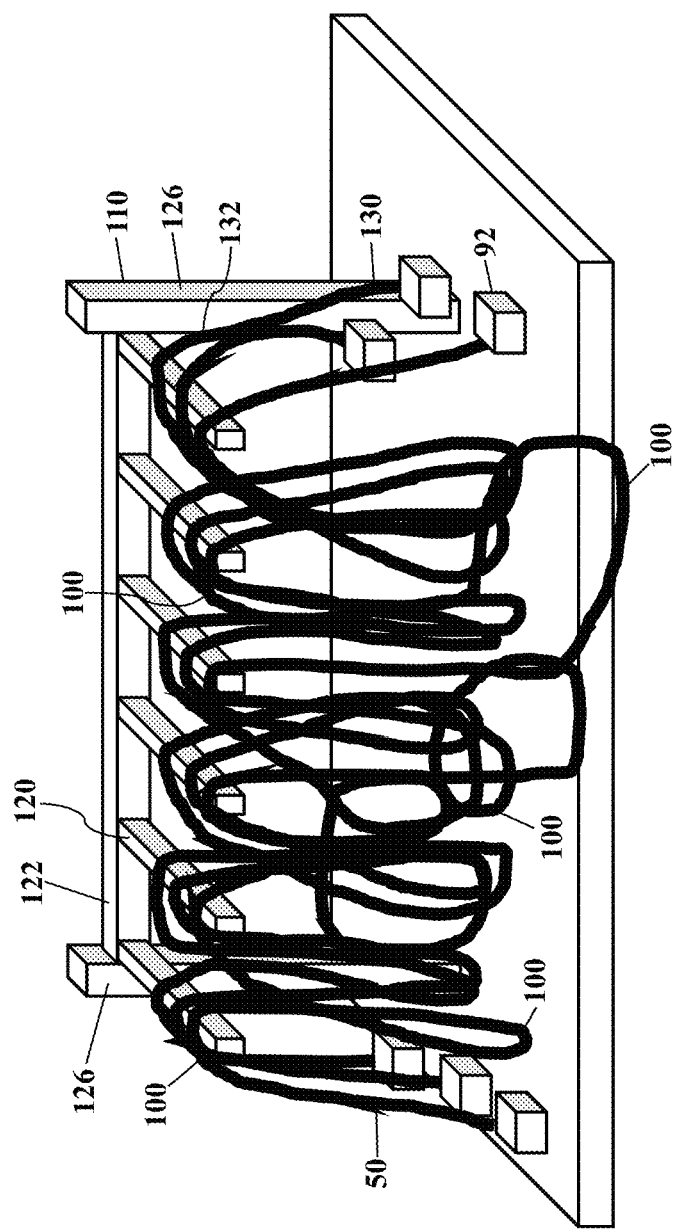
FIGS. 11-12 are schematics illustrating transport of multiple preassembled parallel wire cables, according to exemplary embodiments.
Figure 12:
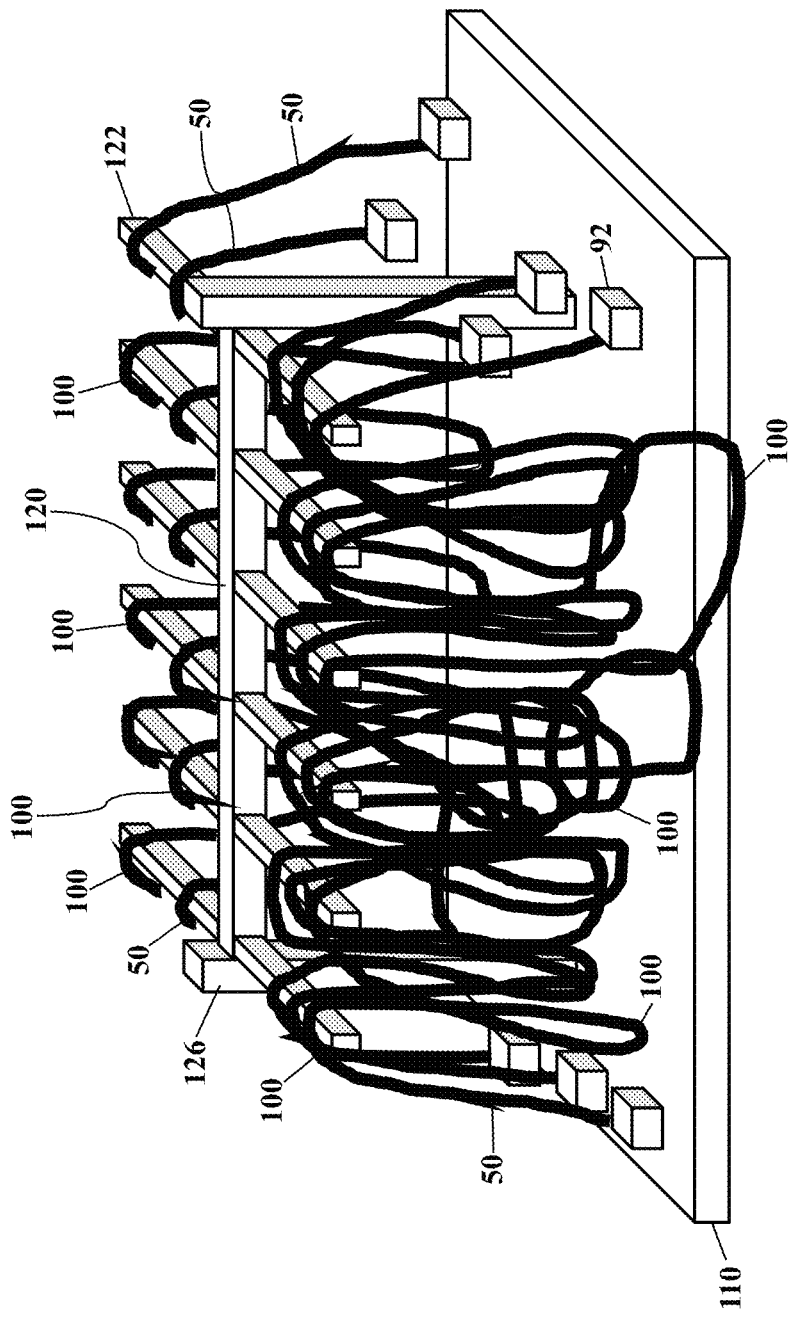

FIGS. 11-12 are schematics illustrating transport of multiple preassembled parallel wire cables 50, according to exemplary embodiments. Here the single transportation rack 110 may accommodate multiple preassembled parallel wire cables 50. That is, multiple preassembled parallel wire cables 50 may be racked or hung from the arms 120 of the transportation rack 110. FIG. 11, for example, illustrates a second preassembled parallel wire cable 130 and a third preassembled parallel wire cable 132 hanging from the arms 120 of the transportation rack 110. Indeed, as FIG. 12 illustrates, the single transportation rack 110 may simultaneously hang many preassembled parallel wire cables 50. Additional arms 120 may outwardly extend from opposite sides of the central beam 120. The transportation rack 110 may thus be loaded on port and starboard sides with one or more days of production of the preassembled parallel wire cables 50.

Figure 13:
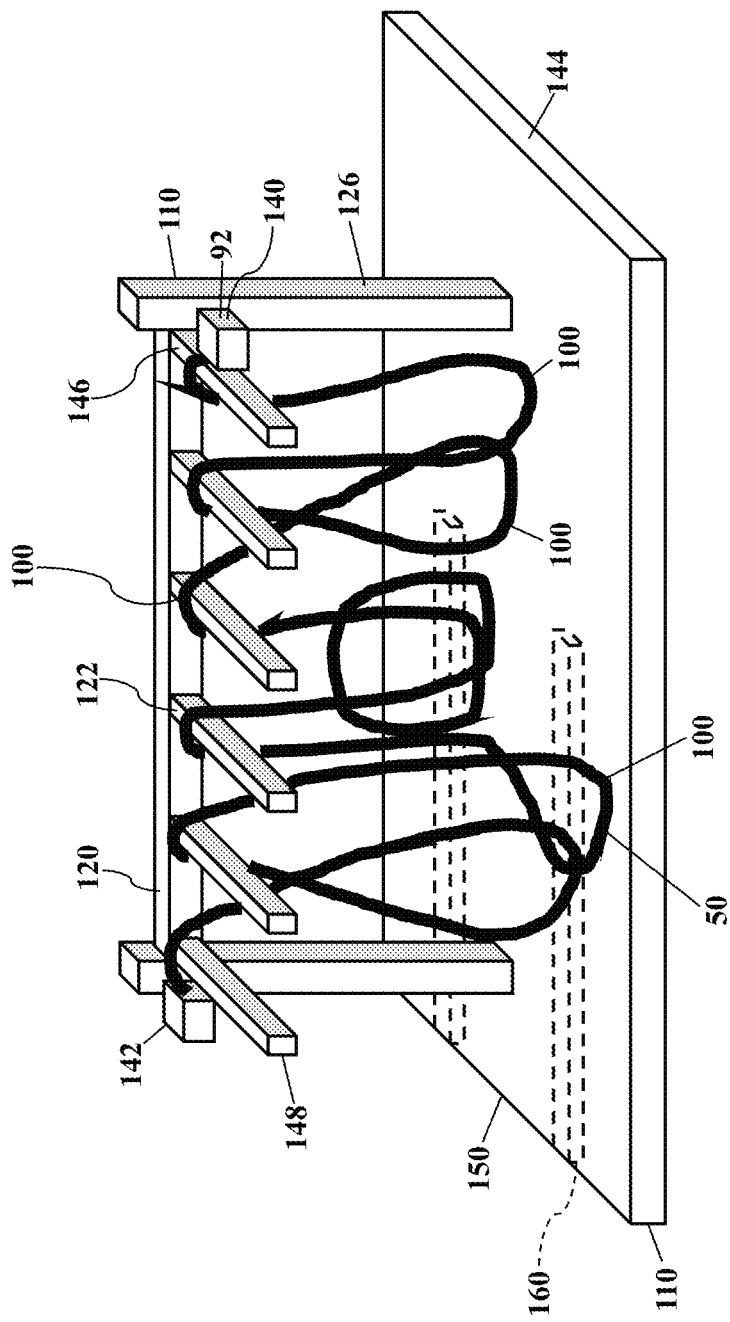
FIG. 13 is a schematic illustrating sequential racking of the preassembled parallel wire cables, according to exemplary embodiments.

FIG. 13 is a schematic illustrating sequential racking of the preassembled parallel wire cables 50, according to exemplary embodiments. As the reader may envision, care may be needed when hanging the multiple preassembled parallel wire cables 50. As the preassembled parallel cable 50 may randomly twist and turn in unpredictable directions, one or more of the preassembled parallel wire cables 50 may be easily tangled and even knotted. Damage and/or lost time may ensue, thus jeopardizing production efficiency.

Sequential racking may be desired. As FIG. 13 illustrates, once the preassembled parallel wire cable 50 is ready for hanging, a worker may first locate and hang a leading one 140 of the sockets 92. The preassembled parallel wire cable 50 may have an orientation identified by the leading socket 140. An opposite, trailing socket 142 readily identifies the other terminal end of the preassembled parallel wire cable 50. The leading socket 140 and the trailing socket 142 may be identified to ensure the preassembled parallel wire cable 50 is correctly oriented for handling and/or for installation. The worker, then, may first locate and hang the leading socket 140 to a leading or front end 144 of the transportation rack 110. That is, the leading socket 140 may be hung on or around a leading, first arm 146 of the transportation rack 110. The worker may next locate and hang the trailing socket 142 on or around a last, trailing arm 148 at a trailing or rear end 150 of the transportation rack 110. No matter how many arms 122 may protrude from the transportation rack 110, this sequential racking helps ensure the proper orientation is maintained and easily identified. After the leading socket 140 and the trailing socket 142 are sequentially hung, the worker may then proceed to hang any of the random cast 100 of loops. No matter what the configuration of the random cast 100 of loops, this sequential racking ensures the leading and trailing ends of the proper orientation are maintained and identified.

Securements may be used. Once the worker hangs the preassembled parallel wire cable 50 to the rack 110, the leading socket 140 and the trailing socket 142 may be secured to their corresponding arms 146 and 148. Any of the random cast 100 of loops may also be secured to their respective arms 122. Ties, hooks, bands, chain or rope may be quickly wrapped or wound around the preassembled parallel wire cable 50 to ensure the correct orientation is maintained during transport. Indeed, as the rack 110 may be transported long distances across continents and/or oceans, any mechanical fastener, adhesive, or welding may be used to secure the preassembled parallel wire cable 50 to the rack 110.

Sequential racking may repeat and continue. Once one preassembled parallel wire cable 50 is hung and secured to the rack 110, another preassembled parallel wire cable 50 may be hung from the same rack 110. The leading socket 140 of the another preassembled parallel wire cable 50 is hung to the leading, first arm 146 of the transportation rack 110. The opposite, trailing socket 142 is then hung to or around the last, trailing arm 148 of the transportation rack 110. The worker then hangs and secures any of the intervening random cast 100 of loops. Because the preassembled parallel wire cables 50 are sequentially hung from their leading socket 140, the possibility of entanglement is reduced or nearly eliminated. The worker may thus sequentially hang as many preassembled parallel wire cables 50 as the transportation rack 110 may hold, usually up to some maximum capacity in total number or weight.

Transportation then occurs. Once the one or more preassembled parallel wire cables 50 are hung to the transportation rack 110, the rack 110 may be loaded on a trailer, ship, or barge for transportation to an installation site. As FIG. 13 illustrates, the transportation rack 110 may include lifting slots or passageways 160 for insertion of lifting forks. A common forklift may thus lift, move, and load the transportation rack 110 onto any carrier's transport. No specialized and/or oversized transport is thus needed to deliver the preassembled parallel wire cables 50 to the installation site.

Figure 14:
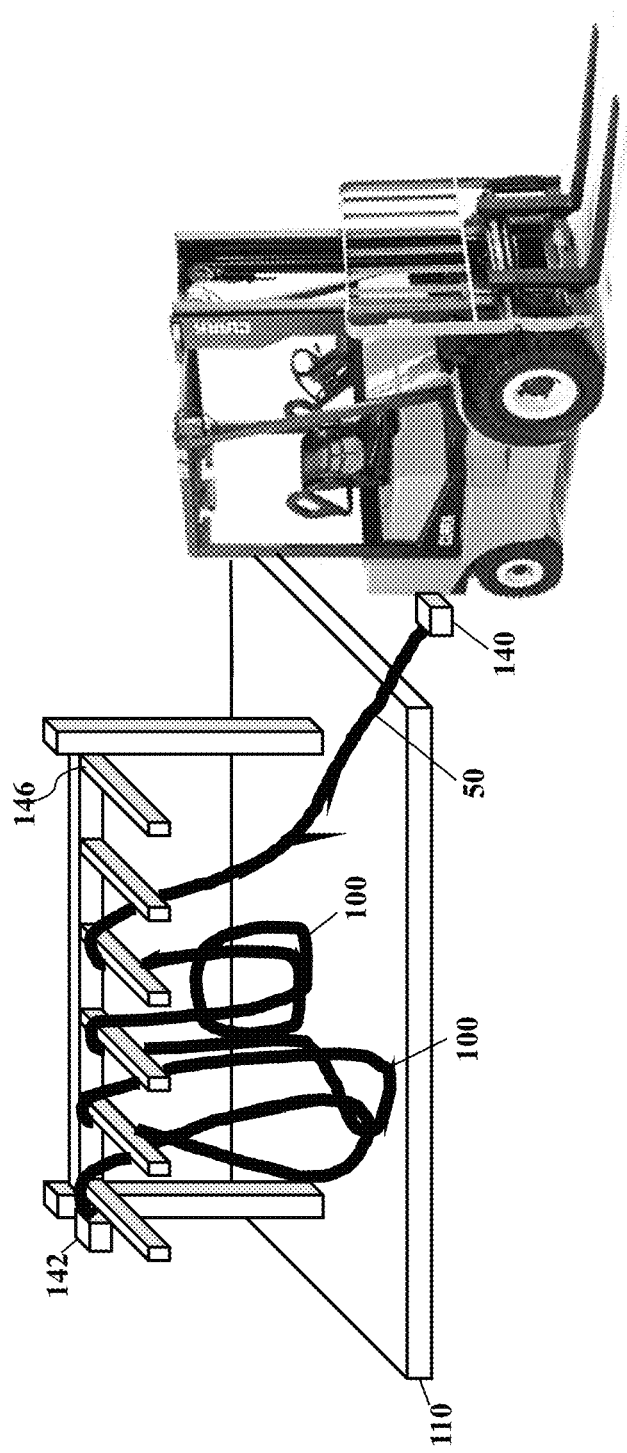
FIG. 14 is a schematic illustrating removal of the preassembled parallel wire cables, according to exemplary embodiments.

FIG. 14 is a schematic illustrating removal of the preassembled parallel wire cables 50, according to exemplary embodiments. Once the transportation rack 110 is delivered to the installation site, the preassembled parallel wire cables 50 are easily removed from the transportation rack 110. Because the preassembled parallel wire cables 50 were sequentially hung from their leading socket 140, each preassembled parallel wire cable 50 may simply be pulled from the rack 110. A worker need only locate an outermost leading socket 140 and begin removing the corresponding preassembled parallel wire cable 50. Because the preassembled parallel wire cables 50 were sequentially hung, the last hung cable is likely the first removed (LIFO). The worker merely detaches and pulls the outermost leading socket 140 to sequentially remove the random cast 100 of loops of the corresponding preassembled parallel wire cable 50. As the leading socket 140 is pulled, the preassembled parallel wire cable 50 extends and reduces the number of the random cast 100 of loops. When the preassembled parallel wire cable 50 is fully extending to nearly its total length, the random cast 100 of loops has been removed by extension. If the preassembled parallel wire cable 50 is too heavy or stiff for human extension, the leading socket 140 may be mechanically pulled (such as by a forklift). Regardless, each preassembled parallel wire cable 50 is easily and quickly removed from the transportation rack 110.

Figure 15:
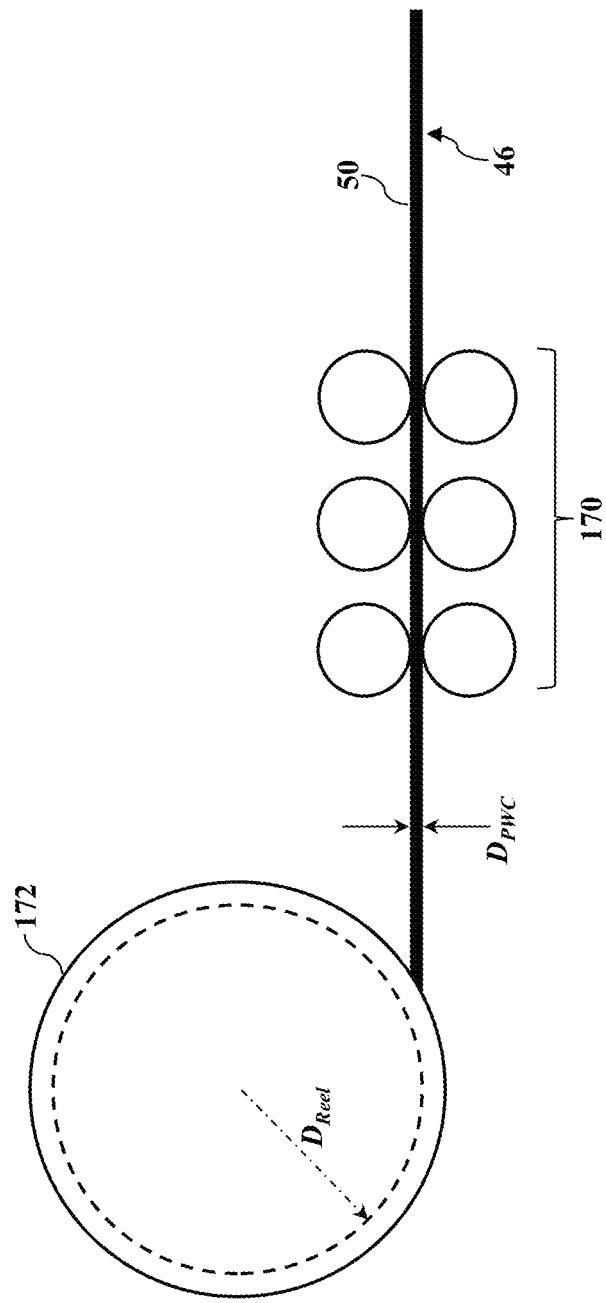
FIG. 15 is a schematic illustrating straightening and reeling of a parallel wire cable, according to exemplary embodiments.

FIG. 15 is a schematic illustrating straightening and reeling of the parallel wire cable 50, according to exemplary embodiments. Once the tension is applied to each individual wire (as illustrated with reference to FIG. 5) the parallel wire cable 50 may be straightened to reduce, or even remove, the memory cast. The parallel wire cable 50, for example, may be fed into a series of rollers 170. Each roller 170 bears down on the parallel wire cable 50 by mechanical or hydraulic force. The series of rollers 170 reduces the memory cast in each individual wire 46, thus producing a generally straight parallel wire cable 50. The generally straight parallel wire cable 50 may then be wound or reeled on a reel 172 for later transport. Methods for straightening and reeling steel cables are known, so this disclosure need not repeat known, conventional techniques.

Practical considerations arise. Because exemplary embodiments are so much stronger than conventional cables, straightening and reeling operations can become impractical for larger diameter wires. For example, the parallel wire cable 50, having a two-inch (2 in.) diameter of the individually tensioned wires, would require the reel 172 to have a diameter of over forty (40) feet. Such a large reel 172 is impractical to load and transport. Moreover, straightening and reeling a two-inch (2 in.) diameter cable 50 would require massive mechanical capabilities, which also greatly increases machinery costs and shop footprint.

Indeed, reeling practicality may be quantified. The inventor has discovered that any reeling operation may be related to the overall diameter of the parallel wire cable 50, according to the relationship Practicality=$f(D_{PWC})$, where $D_{PWC}$ is the diameter of the parallel wire cable 50. This measure of practicality functionally relates the diameter $D_{PWC}$ of the parallel wire cable 50 to the straightening and reeling operations for the same parallel wire cable 50. The measure of practicality, in other words, relates the diameter $D_{PWC}$ of the parallel wire cable 50 to the diameter $D_{Reel}$ of the reel 172. Again using the two-inch (2 in.) outside, overall diameter, the reader realizes that $$\frac{D_{Reel}}{D_{PWC}} \approx 240,$$

meaning the diameter $D_{Reel}$ of the reel 172 is about 240 times greater than the two-inch (2 in.) diameter $D_{PWC}$ of the parallel wire cable 50. The practicality function may be non-linear, as smaller diameter cables may be straightened and reeled using existing machinery. Yet the larger the diameter $D_{PWC}$ of the parallel wire cable 50, then the larger the diameter $D_{Reel}$ of the reel 172 must be, due to non-linear increases in yield strength of exemplary embodiments. Exemplary embodiments, in short, are simply too strong for practical application of straightening and reeling machinery.

Straightening and reeling is perhaps best performed on the job site. Because exemplary embodiments are so strong, exemplary embodiments are preferably transported with the memory cast, as this disclosure explains. However, if straightening and reeling is desired, these operations are perhaps best suited for the installation site. The large rollers of the straightening operation may be set up at the installation site, such as the location of a suspension bridge. Exemplary embodiments may thus be straightened with reduced transportation and handling concerns. Any reeling or coiling operation may also be performed on site. However, given the large diameter reeling operation, roadway property right of ways must be ensured.

Figure 16:
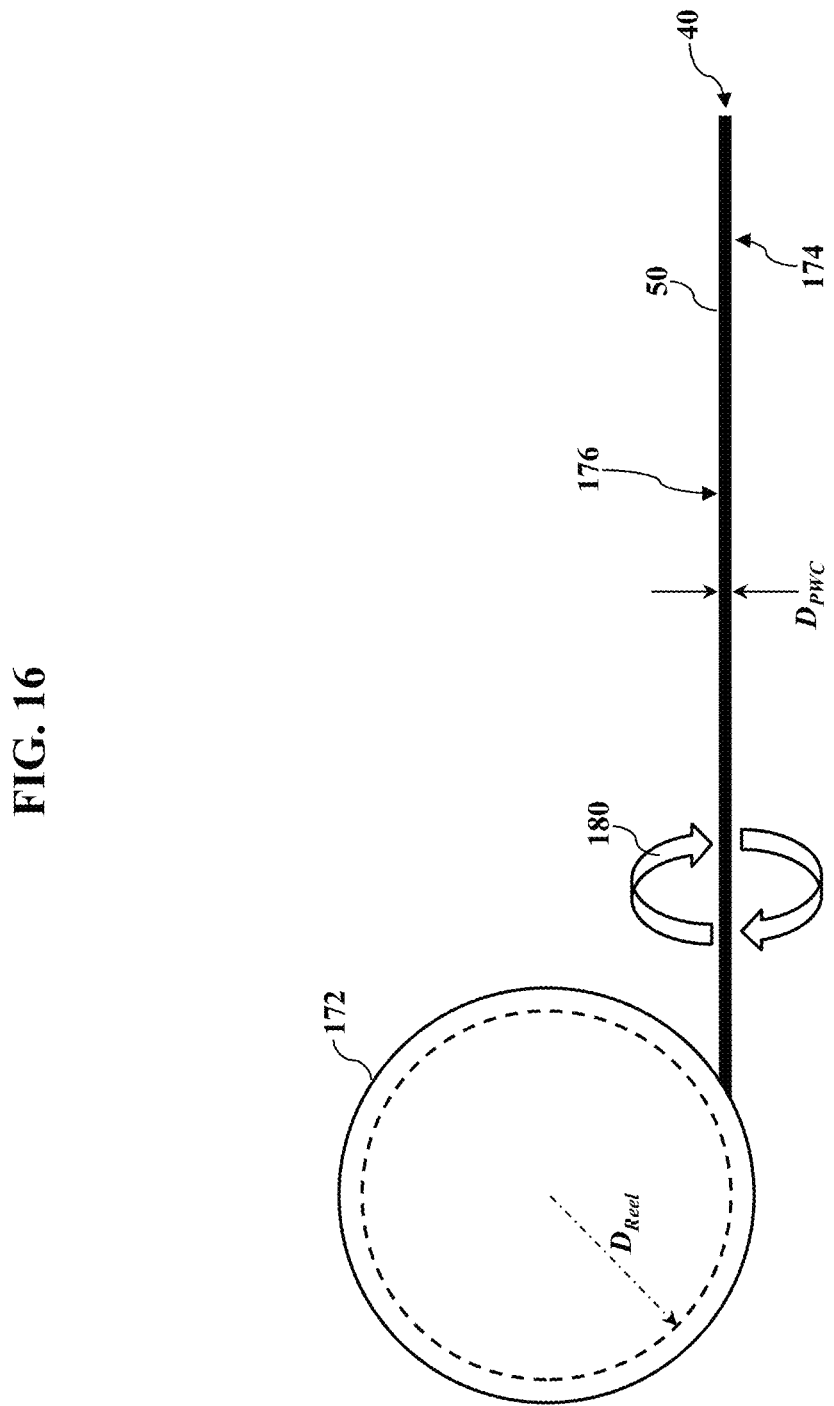
FIG. 16 is a schematic illustrating an additional twisting operation of a parallel wire cable, according to exemplary embodiments.

FIG. 16 is a schematic illustrating an additional twisting operation of the parallel wire cable 50, according to exemplary embodiments. Even if the parallel wire cable 50 is reeled onto the reel 172, the reeling operation must account for geometric considerations. Exemplary embodiments are much stronger than conventional designs, for any kind of bending, as the above paragraphs explain. As the parallel wire cable 50 is reeled onto the reel 172, the parallel wire cable 50 is wrapped into a circular coil. The outer ones 174 of the plurality 40 of wires are thus stretched, as the parallel wire cable 50 is reeled onto the reel 172. Conversely, inner ones 176 of plurality 40 of wires are compressed, as the parallel wire cable 50 is reeled onto the reel 172. The outer wires 174, in other words, are subjected to tension and elongate in length, while the inner wires 176 are subjected to compression and shorten in length. Both compression and elongation are greatest at small diameters of the reeling operation. This nearly simultaneous compression and elongation of opposite sides can alter the parallel wire configuration. A solution is to introduce a rotational twist 180 of the parallel wire cable 50 with each rotation of the reel 172. That is, as the parallel wire cable 50 is reeled onto the reel 172, the parallel wire cable 50 is also longitudinally twisted. Each 360 degree rotation of the reel 172 may require a 360 degree longitudinal twist 180 of the parallel wire cable 50. The longitudinal twist 180 helps maintain the parallel wire configuration of the plurality 40 of wires.

The reeling operation is thus greatly complicated. Because the longitudinal twist 180 may be needed with each rotation of the reel 172, computer control is likely needed. The reeling operation is thus far more expensive and complicated. The inventor has thus discovered a further relation between the diameter $D_{PWC}$ of the parallel wire cable 50 and the drum diameter $D_{Reel}$ of the reel 172. The drum diameter $D_{Reel}$ of the reel 172 increases by the square of the diameter $D_{PWC}$ of the parallel wire cable 50. The equipment costs are also similarly related. In simple words, as the parallel wire cable 50 increases in diameter, the reeling operation squares in physical size and cost. Exemplary embodiments, again in short, are simply too strong for practical application of reeling machinery for all but smaller diameters.

Figure 17:
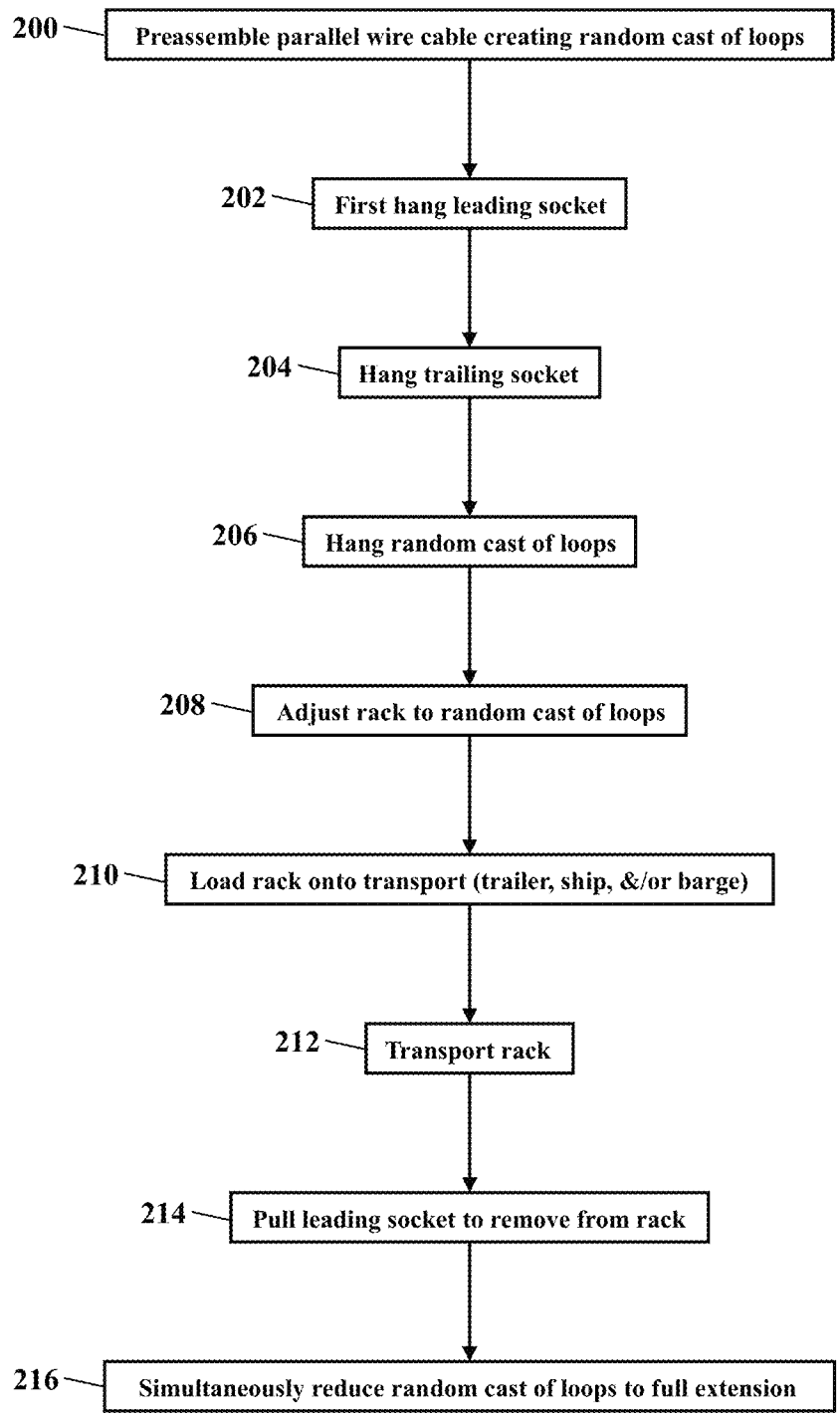
FIG. 17 is a flowchart illustrating a method of transporting the preassembled parallel wire cable, according to exemplary embodiments.

FIG. 17 is a flowchart illustrating a method of transporting the preassembled parallel wire cable 50, according to exemplary embodiments. The parallel wire cable 50 is preassembled creating the random cast 100 of loops (Block 200). The leading socket 140 is sequentially first hung to the transportation rack 110 (Block 202). Second, the trailing socket 142 is next hung to the transportation rack 110 (Block 204). Third, the random cast 100 of loops is then hung to the rack 110 (Block 206). The rack 110 may be adjusted to suit the random cast 100 of loops (Block 208). The rack is loaded onto commercial transport, such as trailer, ship, and/or barge (Block 210). The rack 110 is transported to an installation site (Block 212). The leading socket 140 is pulled to remove the preassembled parallel wire cable 50 (Block 214), which nearly simultaneously reduces the random cast 100 of loops to full extension (Block 216).

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

The invention claimed is:

1. A method, comprising:
   manufacturing a parallel wire cable having a random cast of loops;
   determining a reeling practicality using $$\frac{D_{Reel}}{D_{PWC}},$$

with the $D_{PWC}$ representing a diameter of the parallel wire cable and the $D_{Reel}$ representing a diameter associated with a reeling operation of the parallel wire cable; and
   in response to the reeling practicality, hanging the random cast of loops unreeled.

2. A method of manufacturing a parallel wire cable, comprising:
   creating a random cast of loops in the parallel wire cable by tensioning individual wires in the parallel wire cable;
   determining a reeling practicality using $$\frac{D_{Reel}}{D_{PWC}},$$

with the $D_{PWC}$ representing a diameter of the parallel wire cable and the $D_{Reel}$ representing a diameter associated with a reeling operation for the parallel wire cable;
   determining the reeling operation is impractical based on the reeling practicality; and
   in response to the reeling practicality being impractical, hanging the random cast of loops unreeled.

\* \* \* \* \*